United States Patent Office 3,506,125
Patented Apr. 14, 1970

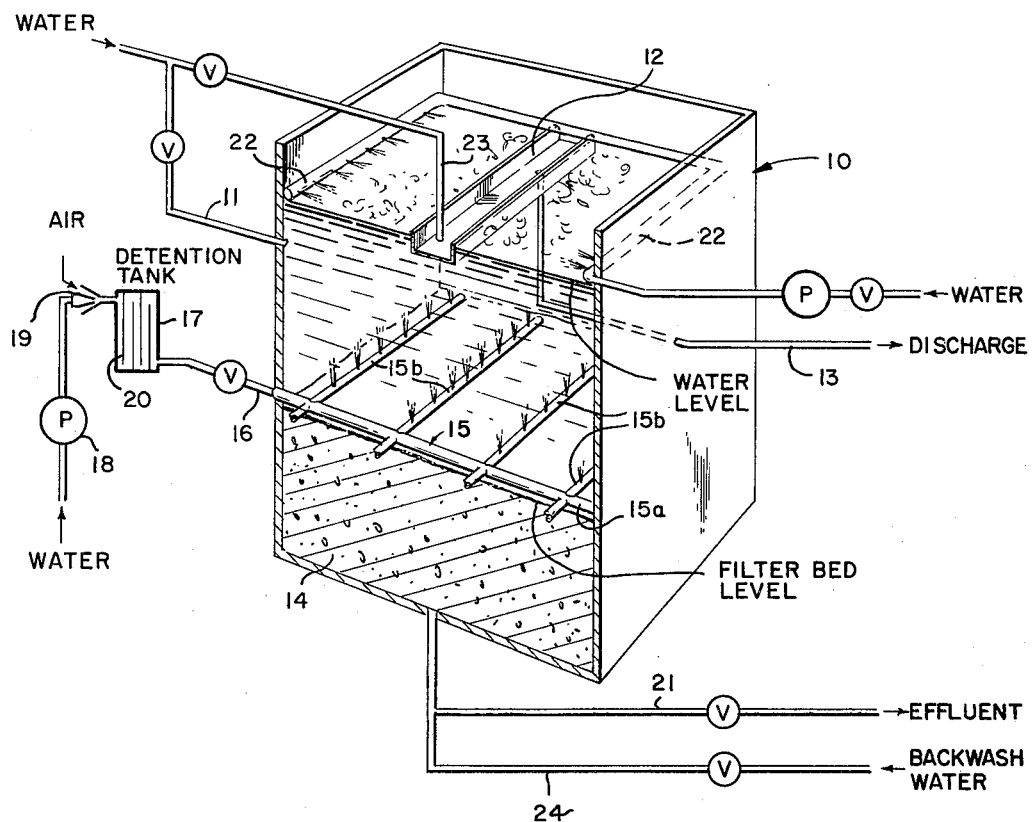

3,506,125
WATER TREATMENT PROCESS FOR IMPROVED GRAVITY FILTERING AND BACKWASHING
Roderick M. Willis, 2624 W. Crocket St. 98199, and Charles L. Oldfather, 4403 52nd Ave. SW. 98116, both of Seattle, Wash.
Filed Sept. 15, 1967, Ser. No. 672,414
Int. Cl. B01d 37/00
U.S. Cl. 210—73
7 Claims

ABSTRACT OF THE DISCLOSURE

Pressurized water saturated with air or other gas is ejected into the downflowing water above the filter media of a gravity filter system during the filtering cycle to form minuscule bubbles of air on the filterable particles present and float these particles to the surface for removal. The same procedure is followed during the backwash cycle as respects the upflowing backwash water above the filter media to assist in speedy removal of the filtered particles.

---

In the treatment of water supplies for potable, industrial and other uses, the water is commonly preconditioned by the addition of chemicals and then passed through settling basins or other means of preseparation before filtering, or in other designs, chemical treatment alone may be employed to precondition the water prior to passing it through filters for removal of the undesirable constituents.

Filters commonly used may employ only a simple media, with the bed being composed of multiple layers of media of different size gradation, or they may be composed of several materials of varying size gradation, placement and specific gravity. Regardless of composition, the filter bed is periodically cleansed of entrapped material by means of reversing the normal filter flow. This cleansing procedure is commonly known as the backwash cycle. Backwashing is usually performed by forcing the backwash water in the opposite direction of filtering flow through the underdraw system of the filter at rates which are sufficient to expand the filter media and wash the entrapped material out of the bed by means of a collection system such as launders or wash troughs.

The efficiency of a water purification plant is generally regarded as the ratio of the quantity of filtered water produced versus the amount of filtered water required for backwashing the filters. It is generally accepted that efficient cleaning of the filter bed is dependent upon two factors, namely (1) expansion of the bed with resulting "scrubbing" of the filter media particles against one another, and (2) sufficient upward velocity of the wash water to carry loosened material into the waste water collection system for disposal. Expansion of the filter bed occurs almost immediately after the start of backwashing, and the lighter materials are easily flushed out. The heavier materials and those exhibiting adhesive tendencies require higher backwash velocities for more extended periods and hence require the greatest amount of backwash water.

From the foregoing, it is seen that the efficiency of a water purification plant may be increased by (1) reducing the loading applied to each filter, irrespective of load changes, and/or (2), reducing the backwash water requirement. The present invention aims to accomplish both of these reductions in a simple, inexpensive and effective manner. The first is accomplished by evenly discharging pressurized water, saturated with air or other gas, across and near the top of the filter bed so that air will be forced out of solution due to the drop in pressure and will form minuscule bubbles. Since these bubbles have an affinity for finite surfaces they tend to attach to the filterable particles present in the water and thereby cause these particles to rise to the surface and form a froth which can easily be removed.

Similarly, reduction of the backwash water requirement is accomplished by also injecting such pressurized air-saturated water during the backwash cycle. This is to be distinguished from the so-called air wash attempted in the past to increase agitation of the filter media during backwash wherein air at about 5 p.s.i. was injected through a manifold near the bottom of the filter at the rate of about 5 cu. ft. of free air per minute per square foot of filter area, such air wash being solely for the purpose of filter bed agitation and being quite ineffective as a flotation procedure.

The single figure in the accompanying drawing illustrates schematically a water purification installation embodying the present invention.

Referring to the drawing, prior to reaching the filter container 10, the raw water is pretreated or conditioned as is well known in the art. For example, coagulating agents and a filter conditioner may be added consecutively before the water reaches the tank inlet 11. Near the top of the tank are one or more wash troughs 12 which traverse the tank and discharge through a drain line 13. During the water filtering operation, the water lever is kept near the top of the trough 12. This is a departure from the conventional arrangement in which the wash troughs are well below the normal operating level of the tank and the water level must be lowered to the trough level at the start of the backwash cycle.

Adjacent to the top of the filter bed 14 the container 10 is equipped with a distributor grid 15 which may comprise a manifold pipe 15a with a plurality of laterals 15b which have multiple perforations at regular intervals to form ejection orifices. A supply pipe 16 from a detention tank 17 is connected to a grid 15, and this tank is in turn supplied by a pump 18 with high pressure water into which air has been injected as by an eductor 19. A water pressure of about 45 to 60 p.s.i. is sufficient. The detention tank 17 is made large enough and is provided with baffles 20 or is otherwise designed to make sure that the injected air goes into solution so that the pressurized water entering the distributor is subsantially saturated with air. Then, as this water ejects from the orifices of the distributor and undergoes a pressure drop, most of the air in solution is forced out of solution and released into the downflowing water entering the filter for discharge as filtered effluent through an effluent line 21 at the bottom of the container 10. This released air forms minuscule bubbles many of which are formed on filterable particles present in the downflowing water so that as the air bubbles rise to the hydraulic surface of the filter they carry such particles with them and form a heavy froth on the surface. This froth is periodically removed as by spraying it with water from perforated pipes 22 into the trough 12 and washing it away with water supplied to the trough at 23. In this manner many filterable particles are removed from the water before it reaches the filter bed.

During backwash of the filter bed wash water is supplied through line 24 to the bottom of the tank and raises the water level over the trough 12 for discharge. Filter bed expansion and agitation is fully developed once the flow velocity of the backwash water has been established, and thus occurs almost immediately.

This expansion and agitation quickly separates the filtered particles from the filter media, but in the past, to actually carry these freed particles up to the waste troughs has required a continuation of the backwash cycle consuming a major portion of the total backwash requirement. By the present invention, during this backwashing the supply of air-saturated pressurized water is continued to the distributor 15 so that as entrapped particles in the filter bed are released the attachment of the air bubbles in the manner afore described causes the particles to rise at a rate much faster than otherwise. By this procedure the duration of the backwash cycle can be substantially reduced, thus allowing more frequent backwash cycles while nevertheless consuming less total backwash water.

In the schematic the distributor 15 has been shown at only one level of the container 10, but this is for purpose of example only, since superior results may be obtained in large installations by introducing the air-saturated water at more than one level during the filtering and/or backwashing cycle. In either case, the filter bed 14 may have single or multiple media. Also, depending upon the filter media, in some instances the distributor 15 may be located slightly above the expansion level of the filter during backwashing so that fine media particles will not be effected by the air bubbles.

It is believed that the invention will have been clearly understood from the foregoing detailed description of my now-preferred illustrated embodiment. In the specification the term "saturated" has been used to indicate that the water supplied to the distributor 15 contains considerably more air or other gas than would be normal for the given temperature and pressure conditions, and is not intended to mean that the water is fully saturated for the given conditions. Furthermore, when filters are used in sewage treatment the present invention is also applicable, and hence the use of the word "water" herein applies as well to the water in sewage treatment. Changes in the details of construction may be resorted to without departing from the spirit of the invention and it is accordingly my intention that no limitations be implied and that the hereto annexed claims be given the broadest interpretation to which the employed language fairly admits.

The embodiments of the invention in which an exclusive property or privilege is claimed are defined as follows:

1. A process for filtering water comprising, supplying a head of water above a filter bed and gravity flowing therethrough, simultaneously ejecting water above the filter bed under pressure greater than said head and containing an excess of gas whereby the gas is forced out of solution and released into the downflowing water responsive to the pressure drop to form minuscule bubbles on filterable particles present and float these particles to the hydraulic surface thereby formng a froth, and removing such froth from the surface while continuing said flow through the filter bed.

2. A process according to claim 1 in which said filter bed is periodically backwashed, and said water with the excess of gas is also ejected into the backwash water.

3. A process according to claim 1 in which said froth is forced into a discharge trough by jets of water sprayed across said surface.

4. A process according to claim 2 in which said froth formed during the filtering cycle is removed at substantially the same level as the backwash water is discharged.

5. A process according to claim 1 in which said water ejected above the filter bed is substantially air-saturated.

6. A process according to claim 1 in which said water ejected above the filter bed is ejected at multiple points spaced apart horizontally.

7. A process for backwashing a gravity filter, comprising flowing backwash water upwardly through an expandable filter bed and discharging the backwash water at a level spaced above the expansion level of the filter bed, and ejecting water uniformally immediately above the expansion level of the filter bed under pressure greater than the water head of the backwash water and containing an excess of gas, thereby forcing the gas out of solution and releasing it into the upflowing backwater water responsive to the pressure drop to form minuscule bubbles on particles in the backwash water and float these particles to the discharge level of the backwash water.

References Cited

UNITED STATES PATENTS

| | | | |
|---|---|---|---|
| 2,538,340 | 1/1951 | Tomek et al. | 210—80 |
| 3,179,252 | 4/1965 | Vrablik | 210—221 X |
| 3,305,092 | 2/1967 | Turk | 210—80 X |
| 3,307,701 | 3/1967 | Krofta | 210—221 X |

REUBEN FRIEDMAN, Primary Examiner

J. W. ADEE, Assistant Examiner

U.S. Cl. X.R.

210—80, 82, 274